United States Patent [19]

Maejima et al.

[11] 4,271,513
[45] Jun. 2, 1981

[54] METHOD AND APPARATUS FOR CARRYING OUT LOOPBACK TEST

[75] Inventors: Hiroshi Maejima, Fujimi; Noriaki Fujimura, Tokyo; Takahiro Shibuya, Tokyo; Shigeyuki Akagi, Tokyo, all of Japan

[73] Assignees: Nippon Telegraph and Telephone Public Corporation; Fujitsu Limited; Oki Electric Industry Co., Ltd.; Nippon Electric Co., Ltd., all of Tokyo, Japan

[21] Appl. No.: 37,383

[22] Filed: May 9, 1979

[30] Foreign Application Priority Data

May 19, 1978 [JP] Japan .................................. 53-598073

[51] Int. Cl.³ ............................................ G06F 11/00
[52] U.S. Cl. ........................................ 371/22; 370/15; 371/24; 371/34
[58] Field of Search ................. 371/22, 24, 34; 370/15

[56] References Cited

U.S. PATENT DOCUMENTS

| | | | |
|---|---|---|---|
| 3,943,305 | 3/1976 | Hagedorn | 371/22 |
| 4,039,751 | 8/1977 | Couturier et al. | 370/15 |
| 4,042,794 | 8/1977 | Lima et al. | 371/22 |
| 4,059,729 | 11/1977 | Eddy et al. | 370/15 |
| 4,112,414 | 9/1978 | Iscol et al. | 371/22 |

*Primary Examiner*—Charles E. Atkinson
*Attorney, Agent, or Firm*—Staas & Halsey

[57] ABSTRACT

The present invention discloses a method for carrying out a loopback test in a data communication system having a first data communication station, a second data communication station and a transmission line connected therebetween. The first data communication station transmits a succession of a first pseudo-random noise signal, a loopback test signal and a second pseudo-random noise signal to the second data communication station by utilizing a usual information data channel, and requires no special channel for carrying out the loopback test. When the second data communication station detects the first pseudo-random noise signal, it transmits the loopback test signal to the first data communication station in order to check the coincidence of the transmitted and the received loopback test signals. The second pseudo-random noise signal denotes the end of the loopback test.

15 Claims, 7 Drawing Figures

METHOD AND APPARATUS FOR CARRYING OUT LOOPBACK TEST

BACKGROUND OF THE INVENTION

(1) Field of the Invention

The present invention relates to a method and apparatus for carrying out a loopback test in a data communication system and, more particularly, to a method for carrying out a loopback test in a data communication system which is comprised of many data communication stations connected in a row by transmission lines, that is the so-called multilevel data communication system.

The data communication system is basically comprised of a first data communication station, a second data communication station and a transmission line connecting the two. The data communication system cannot carry out normal operation when trouble occurs anywhere in the system. Generally, a loopback test is carried out in the system to find the location where the trouble has occurred. Also, the loopback test is carried out in the system to check the area of distribution of noise. The loopback test is generally carried out by comparing two signals. The first signal is a test signal transmitted from a first data communication station and second signal is a test signal which has been transmitted from the first data communication station to a second data communication station and has been returned therefrom to the first data communication station. If the two signals coincide with each other, no trouble exists between the first and second data communication stations. In contrast, if the two signals do not coincide with each other, some trouble exists therebetween.

(2) Description of the Prior Art

In the prior art, two methods for carrying out the loopback test are known. In a first known method, a test channel is employed in the system. This test channel exists independently of the usual information data channel. Control data for carrying out the loopback test is transmitted on the newly employed test channel. In a second known method a control signal for carrying out the loopback test is composed of both a tone signal and a control data signal. The tone signal is, for example a sine wave signal having a fixed frequency of less than 300 Hz or greater than 3,400 Hz in the case where the transmission line is formed by an ordinary telephone line. The tone signal is useful for indicating that the forthcoming signal is not the usual information data, but the control data signal for carrying out the loopback test.

However, each of the above described two known methods have disadvantages. The first method has the following disadvantages: a first disadvantage is that the new control circuit for carrying out the loopback test has to be connected in parallel to each data communication station; a second disadvantage is that it is hard to allot a channel for the test in the usual information data channels, especially when there is no extra channel among the information data channels; third disadvantage is that the first method can not be applied to the multilevel data communication system unless a modem for the test channel is mounted in each data communication station. On the other hand, the second method has the following disadvantages: a first disadvantage is that the tone signal can be transferred only to two adjacent data communication stations connected by a transmission line, for example a telephone line; if adjacent data communication stations are connected by cables, and the two stations are modems, or a modem and a time division multiplexer, the tone signal can not be transferred on the cables. This is because the tone signal is not a digital interface signal but an analog signal; a second disadvantage is that this second method can not be applied to a multilevel data communication system unless an appropriate interface means for the tone signal is mounted in each data communication station.

SUMMARY OF THE INVENTION

Therefore, it is an object of the present invention to provide a method and apparatus, for carrying out a loopback test in a data communication system, which do not have the disadvantages of the two above-mentioned methods.

BRIEF DESCRIPTION OF THE DRAWINGS

The present invention will be more apparent from the ensuing description with reference to the accompanying drawings wherein.

DESCRIPTION OF THE PREFERRED EMBODIMENT

Figures 1A, 1B:
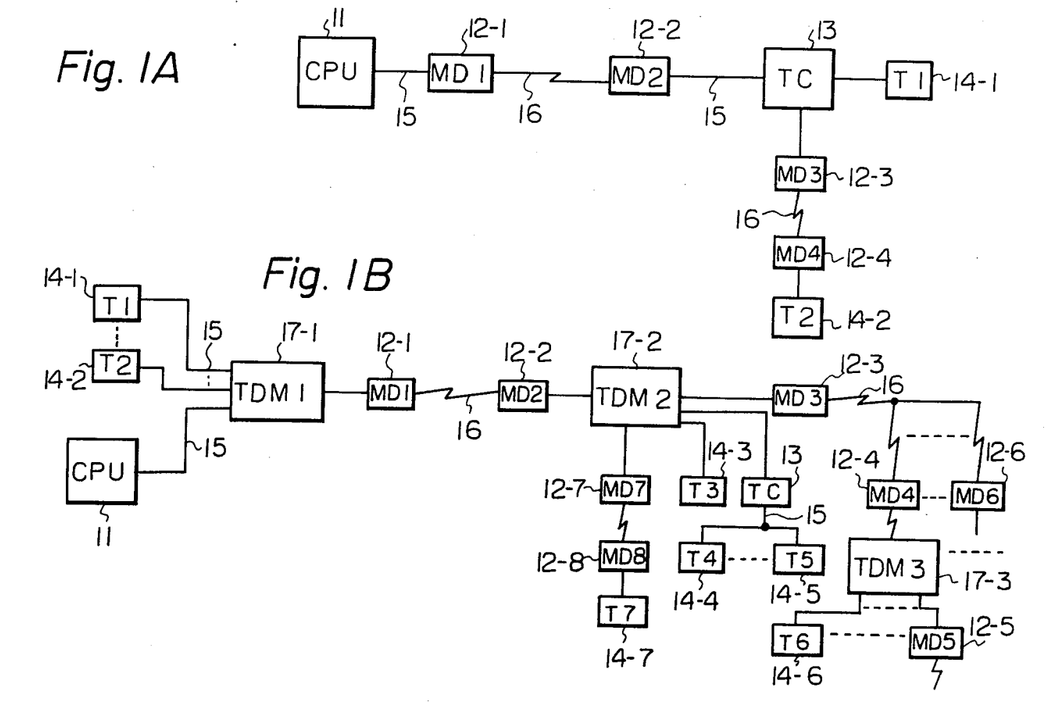
FIG. 1A is a schematic block diagram of one example of a known data communication system.
FIG. 1B is a schematic block diagram of another example of a known data communication system.

In FIG. 1A, the reference numeral 11 represents a central processing unit (CPU), 12-1, 12-2, 12-3 and 12-4 represent modems (MD1, MD2, MD3, MD4), respectively, 13 represents a terminal controller (TC), 14-1 and 14-2 represent terminal equipment (T1, T2), respectively, 15 represents a cable, and 16 represents a transmission line.

The difference between the system illustrated in FIG. 1A and the system illustrated in FIG. 1B, is that the latter system further includes time division multiplexers. In FIG. 1B, the reference numerals 17-1, 17-2 and 17-3 represent time division multiplexers (TDM1, TDM2, TDM3). Members in FIG. 1B and FIG. 1A which are represented by the same reference numerals or symbols, are identical with each other. The time division multiplexer, for example, the time division multiplexer (TDM1) 17-1, is connected to the terminal equipment (T1, T2) 14-1, 14-2 and the central processing unit (CPU) 11. Information data produced from these members is applied to the multiplexer 17-1 and is time-divisionally multiplexed therein. The multiplexed information data is then transmitted to the time division multiplexer (TDM2) 17-2 by way of modems 12-1, 12-2 and the transmission line 16 therebetween. The information data is distributed from the multiplexer 17-2 to a desired terminal station, such as the modems, the terminal controller or the terminal equipment.

The terminal controller 13 collectively controls the operations of the terminal equipment 14-4 and 14-5 by an instruction generated in the controller 13 itself, or by an instruction supplied from the central processing unit 11.

The time division multiplexer 17-2 is connected to the remote time division multiplexer 17-3 by way of the modems 12-3 and 12-4. Further, the multiplexer 17-2 is connected to the remote terminal equipment 14-7 by way of modems 12-7 and 12-8. Furthermore, the multiplexer 17-2 is directly connected to the remote terminal equipment 14-3, and the multiplexer 17-2 is connected to the remote terminal equipment 14-4 and 14-5 by way of the terminal controller 13.

In the data communication system, for example, the data communication system illustrated in FIG. 1A, the loopback test is carried out to find the position where trouble has occurred in this system. When the loopback test is carried out in the system, a first data communication station, for example, the central processing unit 11, transmits a test signal to a second data communication station, for example, the modem 12-2. Then the modem 12-2 sends back the received test signal to the central processing unit 11. The unit 11 compares the test signal which was transmitted therefrom and the test signal which is sent back from the modem 12-2. If the two test signals coincide with each other, the unit 11 determines that there is no trouble between the unit 11 and the modem 12-2. In contrast, if the two test signals do not coincide with each other, the unit 11 determines that the trouble occurs therebetween. As previously mentioned, there are two methods for carrying out the loopback test. However, these two methods contain the aforesaid various kinds of disadvantages.

The method for carrying out the loopback test, according to the present invention, will now be explained. The outstanding feature of the present invention resides in the fact that the test signal can be transferred by way of the usual information data channel. Accordingly, it is not necessary to employ the aforesaid new control circuit and the aforesaid new test channel in the system, as in the above mentioned first known method. Also, it is not necessary to employ the aforesaid modem for the test channel, as in the first known method, or the aforesaid interface means, as in the second known method. In other words, the method of the present invention can be applied to not only the single-level data communication system but, also, the multilevel data communication system. This is because, the test signal used in the present invention is not a form of a special signal, but is substantially the same as the form of the usual information data signal. Thus, this test signal can be transmitted to the end data communication station, as is the usual information data signal. As mentioned above, in the present invention, both the test signal and the usual information data signal are transmitted over the same information data channel. Therefore, a means for distinguishing the test signal from the usual information data signal must be provided. However, a practical signal distinguishing means has not previously been developed. It should be noted that, if no such means is employed, any of the data communication stations will treat the test signal as the information data signal or vice versa, and a malfunction will occur in the data communication station.

Figure 2:
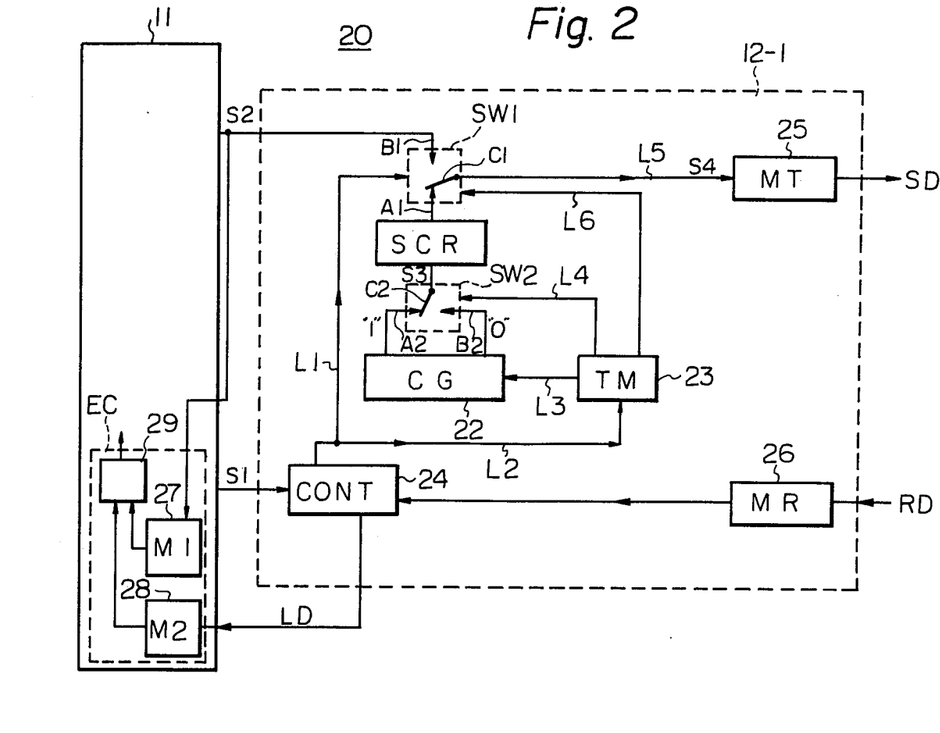
FIG. 2 is a schematic block diagram of a first data communication station which performs a loopback test in accordance with one method of the present invention.
Figure 3:
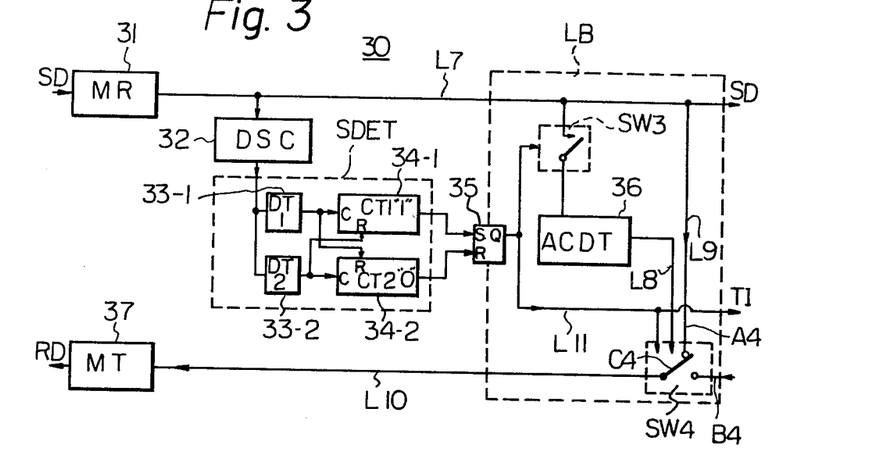
FIG. 3 is a schematic block diagram of a second data communication station to be tested by the first data communication station in accordance with the method of the present invention.

The means for distinguishing the test signal from the information data signal, according to the present invention, is illustrated in FIGS. 2 and 3. FIG. 2 is a schematic block diagram illustrating a first data communication station which performs the loopback test in accordance with the method of the present invention. FIG. 3 is a schematic block diagram illustrating a second data communication station to be tested by the first data communication station in accordance with the method of the present invention. The first data communication station 20 of FIG. 2 is specifically comprised of, for example, the central processing unit 11 and the modem 12-1 (see FIG. 1A). The second data communication station 30 specifically represents, for example, the modem 12-2 (see FIG. 1A).

Figure 4:
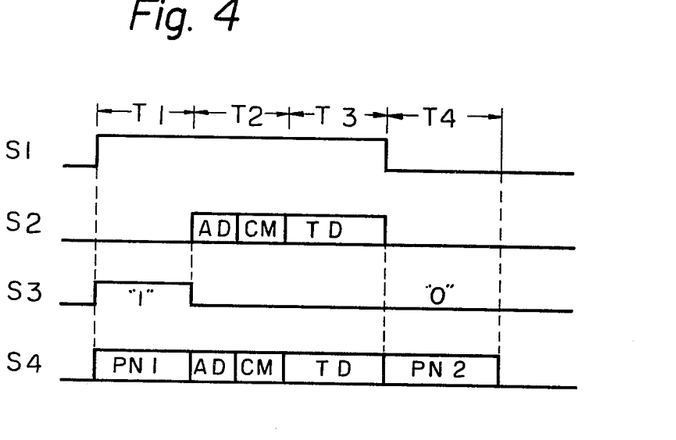
FIG. 4 shows timing charts utilized to illustrate the operation of the first data communication station 20 of FIG. 2.

The operation of the first data communication station 20 illustrated in FIG. 2 will be explained by referring to FIG. 4. FIG. 4 is composed of timing charts utilized for explaining the operation of the first data communication station 20.

The central processing unit 11 provides a test control signal S1 to a controller 24. The signal S1 commands commencement of the loopback test. The signal S1 is indicated in FIGS. 2 and 4. When the controller 24 receives the signal S1, the controller 24 actuates a switch SW1 by way of a line L1, so as to connect a contact C1 to a terminal A1. Simultaneously, the controller 24 actuates a timer 23 by way of a line L2. Then, the timer 23 energizes a character generator 22 by way of a line L3 during a predetermined time T1 (see FIG. 4). Simultaneously, the timer 23 actuates a switch SW2 by way of a line L4, so as to connect a contact C2 to a terminal A2. The character generator 22 produces a first bit pattern and a second bit pattern, which are different from each other. The first bit pattern may be, for example, (1001001001 . . . ), and the second bit pattern may be, for example, (0110110110 . . . ). In the example of the present invention, the first bit pattern is (11111 . . . ) and the second bit pattern is (00000 . . . ). The first and second bit patterns are applied to the terminal A2 and a terminal B2 of the switch SW2. The timer 23, as mentioned above, defines the predetermined time T1. The time T1 corresponds to the so-called Preparatory-phase. During the Preparatory-phase T1, a scrambler (SCR) 21 receives a bit pattern signal S3 (see FIGS. 2 and 4). Since the contact C2 of the switch SW2 is connected to the terminal A2 during the Preparatory-phase T1, the bit pattern signal S3 is the all "1" bit pattern signal. Then, the scrambler 21 scrambles the all "1" bit pattern signal, so as to produce a first pseudo-random noise signal (hereinafter referred to as PN1 signal). The scrambler 21 scrambles the all "1" bit pattern by multiplying these "1" bits in accordance with a predetermined polynominal, for example, $1+X^4+X^7$, and produces the PN1 signal. Accordingly, a transmission signal S4 (see FIGS. 2 and 4) on a line L5 is composed of the PN1 signal during the Preparatory-phase T1. The PN1 signal indicates, to the second data communication station 30 (FIG. 3), that the forthcoming transmission signal S4 is not the usual information data signal, but the test signal. Thus, the second data communication station can distinguish the test signal from the usual information data signal. In this case, it is important to note that a bit pattern which is the same as the bit pattern of the PN1 signal should not coincide with any of bit patterns which compose the usual information data signal. If such coincidence of signals occurs at the second data communication station, a malfunction will occur in this station. In the example of the present invention, the PN1 signal is a psuedo-random noise signal and, further, the PN1 signal has a very long bit length, for example, a 64 bit length, compared to a conventional bit length of the information data signal, for example, 8 through 10 bits. Therefore, the probability of occurence of the above mentioned coincidence of signals is $2^{-64}$. In other words, such coincidence of signals will occur with the probability of one time per 30,000,000 years when the transfer rate of the information data signal is 9,600 bit per second. Thus, it will be understood that the method of the present invention is definitely practical for use. If the probability can be decreased, the bit length can be shorter than 64.

At the end of Preparatory-phase T1, the timer 23 actuates the switch SW1, by way of a line L6, so as to connect the contact C1 to the terminal B1. At the same time, the central processing unit 11 provides a test control data signal S2 (See FIGS. 2 and 4), instead of the information data signal, during an Address/Command-phase T2 and a Test-phase T3 (see FIG. 4). The test control data signal S2 is composed of address data AD, command data CM and test data TD. The transmission signal S4 (see FIG. 4) on the line L5 is composed of the test control data signal S2 during the phases T2 and T3. The address data AD specifies a second data communication station to be tested. For example, in FIG. 1A, the modem 12-2 has an address AD. The terminal controller 13 has an address AD', the terminal equipment 14-1 has an address AD" and so on. Accordingly, in a single-level data communication system comprising only, for example, the modems 12-1 and 12-2, such address data may be deleted. The command data CM specifies one of the various kinds of test commands. Accordingly, in a data communication system which requires only the loopback test to be carried out therein, such command data may also be deleted. In such system, the PN1 signal may indicate that the loopback test is to be carried out without providing the loopback test command CM.

At the end of the Test-phase T3, the timer 23 actuates the SW1, by way of the line L1, so as to connect the contact C1 to the terminal A1 again. AT the same time, the timer 23 actuates the SW2, by way of the line L4, so as to connect the contact C2 to the terminal B2. Then, a Terminating-phase T4 (see FIG. 4) begins. During the Terminating-phase T4, the scrambler 21 receives the bit pattern signal S3 (see FIGS. 2 and 4). Since the contact C2 of the switch SW2 is connected to the terminal B2 during the Terminating-phase T4, the bit pattern signal S3 is the all "0" bit pattern signal. Then, the scrambler 21 scrambles the all "0" bit pattern signal so as to produce a second pseudo-random noise signal (hereinafter referred to as PN2 signal). The scrambler 21 scrambles the all "0" bit pattern by multiplying these "0" bits in accordance with the aforesaid polynominal, that is, $1+X^4+X^7$, and produces the PN2 signal. Accordingly, the transmission signal S4 (see FIGS. 2 and 4) on the line L5 is composed of the PN2 signal during the Terminating-phase T4. The PN2 signal indicates, to the second data communication station 30 (FIG. 3), that the loopback test is now finished.

The transmission signal S4 on the line L5 is transmitted to the second data communication station, via a modem transmitter (MT) 25, as a sending data signal SD (see FIG. 2), during the phases T1 through T4. The transmitter 25 acts as a modulator.

Referring to FIG. 3, the second data communication station 30, that is the modem 12-2 of FIGS. 1A and 1B, receives the sending data signal SD supplied from the first data communication station 20 (see FIG. 2). The signal, SD via a modem receiver (MR) 31, is applied, on one hand, to a descrambler (DSC) 32, and is applied, on the other hand, to the next station, for example, the terminal controller 13 and so on of FIG. 1A, through the station 30. The descrambler 32 descrambles the signal SD in accordance with the aforesaid polynominal $1+X^4+X^7$. The descrambled signal SD is applied to a signal detector SDET, which is comprised of a "1" bit detector (DT1) 33-1, a "0" bit detector (DT2) 33-2, a first counter (CT1) 34-1 and a second counter (CT2) 34-2. Thus, the signal detector SDET is very simple in construction. This is because, in the example of the present invention, the all "1" bit pattern signal is produced from the character generator 22 (see FIG. 2) as the first bit pattern, and the all "0" bit pattern signal is produced therefrom as the second bit pattern. If the bit pattern is, for example (1001001001 . . . ) or (0110110110 . . . ), the signal detector SDET must be comprised of a ROM (Read Only Memory) which stores the above bit patterns (1001001001 . . . ) and (0110110110 . . . ), a register means which holds the signal SD and a comparator means which compares the content of the register means with the content of the ROM, whereby the signal detector SDET will become very complicated in construction.

In the signal detector SDET, each time the "1" bit pulse appears in the descrambled signal SD from the descrambler 32, the first counter 34-1 increases the count number thereof, while, each time the "0" bit pulse appears in the descrambled signal SD, the second counter 34-2 increases the count number thereof. However, each time the "1" bit pulse appears in the descramble signal SD, the second counter 34-2 is reset to zero. Similarly, each time the "0" bit appears therein, the first counter 34-1 is reset to zero. Therefore, the first counter 34-1 can increase the count number thereof only when successive "1" bit pulse trains appear in the descrambled signal SD. Contrary to this, the second counter 34-2 can increase the count number thereof only when successive "0" bit pulse trains appear in the descrambled signal SD.

At the time the PN1 signal (see FIG. 4) of the signal SD is applied to the descrambler 32, the first counter 34-1 successively increases its count number, because PN1 signal is an all "1" bit pattern signal having a bit length of, for example, 64 bits. When the count number of the first counter 34-1 reaches 64, the output of the counter 34-1 is applied to the set-input of a flip-flop circuit 35. At this time, the signal detector SDET determines that the first data communication station 20 (see FIG. 2) has commenced the loopback test in the data communication system, and the SDET causes the flip-flop circuit 35 to hold a logic "1" at its Q-output. The logic "1" of the Q-output makes a switch SW3 of a loopback means LB close. Then, the input of an address/Command detector (ACDT) 36 is connected to a line L7. When the detector 36 detects that the address data AD (see FIG. 4) is the same as the address of this data communication system 30, and also detects that the command data CM (see FIG. 4) commands to carry out the loopback test, then the output from the detector 36 operates a switch SW4, by way of a line L8, so as to connect a contact C4 to a terminal A4. As a result, a loopback line, which is comprised of the line L7, a line L9 and a line L10, is created. If the detector 36 detects that the address data AD and the command data CM are not directed to this station 30, the contact C4 is still connected to a terminal B4, and as a result, the loopback line can not be created. If the address data AD and the command data CM are directed to the terminal equipment 14-2 (see FIG. 1A), the loopback line will be created at this equipment 14-2. It should be noted that an arrangement which is identical with the arrangement illustrated in FIG. 3, is also employed in each of the stations, for the terminal controller 13, the terminal equipment 14-1, modems 12-3, 12-4 and the above mentioned equipment 14-2, in the system of FIG. 1A. In FIG. 3, the reference symbol T1 denotes a test indicating signal. If there is a terminal equipment (not shown) which cooperates with this station 30, the signal TI indicates to this terminal equipment that the forthcoming signal is not the usual information data signal but the test signal, and also, indicates thereto that the usual information data signal should not be provided therefrom, because the loopback test is now being carried out.

After the above mentioned loopback line (L7, L9, L10) is created, the test data TD (see FIG. 4) is sent back from this station 30 to the first data communication station 20 (see FIG. 2), via a modem transmitter 37 which acts as a modulator.

Returning again to FIG. 2, the first data communication station 20 receives a receiving data signal RD sent back from the station 30 (see FIG. 3). The signal RD is applied to a modem receiver 26, which acts as a demodulator. The receiving data signal from the receiver 26 is applied to the controller 24, and is further supplied to an error check means EC in the central processing unit 11. The error check means EC determines whether or not the sent back receiving test data RD coincides with the previously transmitted test data TD (see FIG. 4). If these data coincide with each other, the first data communication station 20 determines that there is no trouble between the first and second data communication stations. If not, the station 20 determines that some trouble exists therebetween. In the example of the present invention, the error check means EC is comprised of a transmitted test data memory (M1) 27, a received test data memory (M2) 28 and a comparator means 29. The content of the data stored in the memory 27 is the same as the test data TD contained in the signal S2 (see FIG. 4) and, accordingly is the same as the test data TD contained in the signal S4 (see FIG. 4). On the other hand, the memory 27 stores the test data which is now received, as a loopback data LD (see FIG. 2), at this station 20. The comparator means 29 compares the data LD of the memory 28 with the data TD of the memory 29, in order to check the coincidence of the data LD and the data TD.

When the central processing unit 11 finishes checking the coincidence of the data LD and the data TD, the unit 11 stops providing the test control signal S1 (see FIG. 4). Then, the controller 24 detects the falling edge of the signal S1 and actuates the timer 23 by way of the line L2. At the same time, the controller 24 actuates the switch SW1, by way of the line L1, so as to connect the contact C1 to the terminal A1, and also, the timer 23 actuates the switch SW2, by way of the line L4, so as to connect the contact C2 to the terminal B2 during the Terminating-phase T4 (see FIG. 4). During the Terminating-phase T4, the aforesaid PN2 signal, which has a scrambled bit pattern with respect to the all "0" bit pattern, is transmitted to the second data communication station 30.

Returning again to FIG. 3, in the second communication station 30, the descrambler 32 produces the all "0" bit pulses when the PN2 signal is applied thereto. When the second counter 34-2 counts, via the detector 33-2, the 64 bits of the "0" bit pulses, the output from the counter 34-2 is applied to the reset-input of the flip-flop circuit 35, and the Q-output of the circuit 35 is reset to logic "0". Accordingly, the switch SW3 is caused to become open, and the switch SW4 is actuated, by way of a line L11, so as to connect the contact C4 to the terminal B4. Also, the aforesaid test indicating signal TI disappears.

Figure 5:
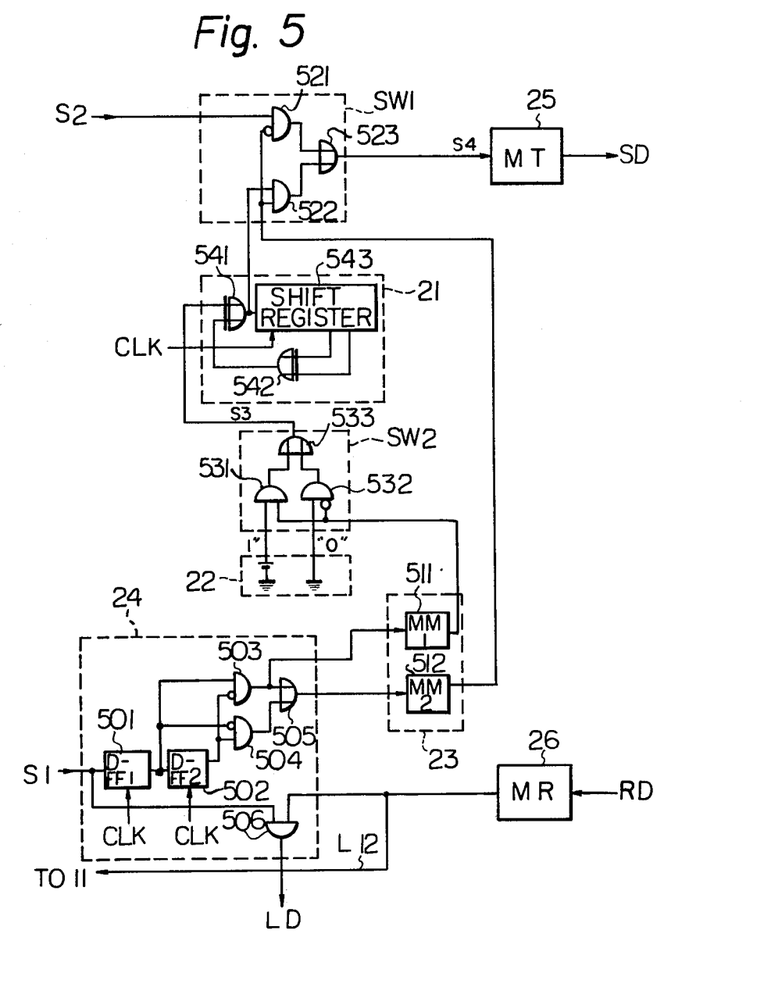
FIG. 5 is a detailed circuit diagram of an example of the first data communication station 20 of FIG. 2.

In FIG. 5, which is a detailed circuit diagram illustrating an example of the first data communication station 20, especially the modem 12-1 in FIG. 2, the members which are represented by the same reference numerals or symbols as those used in FIG. 2, are identical to those members of FIG. 2. The test control signal S1 is applied to a first delay-flip-flop circuit (D·FF1) 501 of the controller 24. A second delay-flip-flop circuit (D·FF2) 502 is connected to the circuit 501. The reference symbol CLK denotes a usual clock pulse. The outputs from the flip-flop circuits 501 and 502 are applied to the respective inputs of a first AND gate 503 and a second AND gate 504. The output of the gate 503 indicates a detection of the rising edge of the signal S1. The output of the gate 504 indicates a detection of the falling-edge of the signal S1. The output from the gate 503 triggers a first monostable multivibrator (MM1) 511 of the timer 23 and, also, triggers a second monostable multivibrator (MM2) 512 via an OR gate 505 of the controller 24. The output of the multivibrator 512 defines the duration of the preparatory-phase T1 (see FIG. 4) and closes a first AND gate 521, while it opens a second AND gate 522 in the switch SW1. At the same time, the output of the multivibrator 511 opens a first AND gate 531, while it closes a second AND gate 532 in the switch SW2. Therefore, the logic "1" level voltage is applied, as the signal S3 (see FIG. 4), to the scrambler 21 by way of the gate 531 and an OR gate 533. The scrambler 21 is comprised of a first EXOR (EXCLUSIVE-OR) 541, a second EXOR 542 and a shift register 543, which scrambler is already known. The scrambled output from the scrambler 21, that is the PN1 signal (see FIG. 4), is transmitted to the second data communication station 30 (see FIG. 3), as the sending data signal SD, via the gate 522 which is now open, an OR gate 523 and the modem transmitter 25.

When the second monostable multivibrator 512 finishes providing its output of the logic "1", the output of the logic "0" closes the gate 522, while it opens the gate 521. Thereafter, the Address/Command-phases T2 and the Test-phase T3 (see FIG. 4) commence. In the phases T2 and T3, the address data AD and the command data CM, contained in the signal S2, are applied to the second data communication station 30 (see FIG. 3) as the sending data signal SD, via gate 521 which is now open, the gate 523 and the transmitter 25. Immediately after the phase T2, the test data TD is also transmitted to said station 30.

Figure 6:
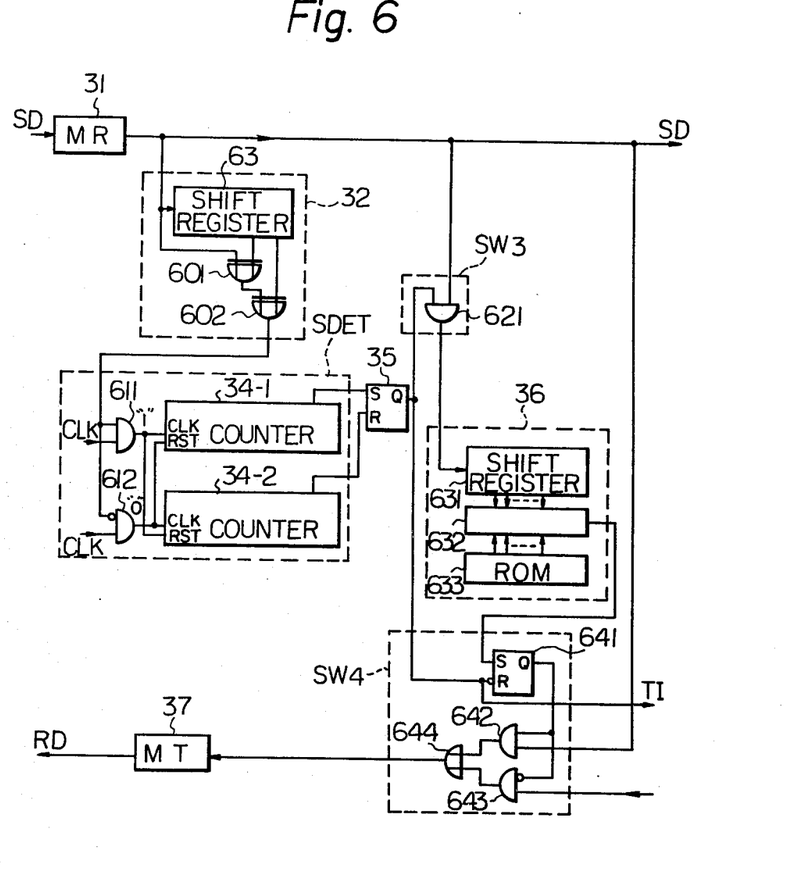
FIG. 6 is a detailed circuit diagram of an example of the second data communication station 30 of FIG. 3.

In FIG. 6, which is a detailed circuit diagram illustrating an example of the second data communication data station 30 in FIG. 3, said sending data signal SD is applied to the modem receiver 31, wherein the members which are represented by the same reference numerals or symbols as those used in FIG. 3, are identical to those members of FIG. 3. The descrambler 32 is comprised of a first EXOR gate 601, a second EXOR gate 602 and a shift register 603, which descrambler is already known. In the signal detector SDET, the "1" and "0" bit detectors 33-1 and 33-2, of FIG. 3, are composed of first and second AND gates 611 and 622, respectively. The switch SW3 is composed of an AND gate 621. When the Q-output of the flip-flop circuit 35 becomes the logic "1" the AND gate 621 opens. Then, the address data AD and the command data CM from the receiver 31 are applied to the address/command detector 36, via the gate 621 which is open now. The detector 36 is comprised of a shift register 631, a comparator 632 and a ROM (Read Only Memory) 634. The ROM stores an address data which is previously alloted to this station 30 and a command data which commands commencement of the loopback test. When the detector 36 determines, by means of a comparator 632, that the address data AD and the command data CM, both contained in the signal SD, are the same as the corresponding datum stored in the ROM 634, the output of the detector 36 is applied to the set-input of a flip-flop circuit 641 in the switch SW4. Then, the output of this circuit 641 opens a first AND gate 642, while it closes a second AND gate 643. Therefore, the test data TD contained in the signal SD is sent back to the first data communication station 20 (see FIG. 2), via the line L9, the gate 642 which is open now, an OR gate 644 and the modem transmitter 37, as the receiving data signal RD of said station 20.

Returning again to FIG. 5, the receiving data signal RD is applied to the memory 28 (see FIG. 2), as the loopback data LD, via the receiver 26 and an AND gate 506 which is open now. The usual information data signal from the receiver 26, during the time a loopback test is not carried out, is supplied to the central processing unit 11 (see FIG. 2) via a line L12. The AND gate 506 opens during the time the test control signal S1 is applied thereto.

When the central processing unit 11 (see FIG. 2) stops providing the signal S1, the gate 504 in the controller 24 detects the falling edge of the signal S1 and triggers the multivibrator 512 in the timer 23, via the OR gate 505. Then, the gate 521 is closed, while the gate 522 is opened, in the switch SW1. On the other hand, the multivibrator 511 in the timer 23 has already stopped providing logic "1" at some time during the phases T2 and T3 (see FIG. 4), and accordingly, the gate 532 is open now, while the gate 531 is closed. Therefore, the logic "0" level voltage is applied, as the signal S3 (see FIG. 4), to the scrambler 21 by way of the gate 532 and the OR gate 533. The scrambled output from the scrambler 21, that is, the PN2 signal (see FIG. 4), is transmitted to the descrambler 32 (see FIG. 6).

Returning again to FIG. 6, the descrambled output from the descrambler 32, when the PN2 signal is applied thereto, increases the count number of the second counter 34-2 via the gate 612. The output from the counter 34-2 resets the flip-flop circuit 35, and the logic "0" level output of this circuit 35 closes the AND gate 621 and, also, resets the flip-flop circuit 641 to produce a logic "0" level output. Thereafter, the gate 642 is closed, while the gate 643 is opened. Thus, the loopback line via the line L9 disappears and the loopback test is finished. In the above example, the method of the present invention is directed only to modems; however, it should be noted that the method of the present invention can also be applied to the other data communication stations, such as the time division multiplexers, the terminal equipment and the terminal controller.

As explained above, the method for carrying out the loopback test, according to the present invention, does not create any of the aforesaid disadvantages of the known method for carrying out the same. This is because the test signal can be transmitted on the same channel as the information data signal.

What is claimed is:

1. A method for carrying out a loopback test in a data communication system having a first data communication station, a second data communication station and a transmission path connected therebetween, comprising the steps of:
   (a) generating, in order, a first pseudo-random noise signal, a loopback test signal, and a second pseudo-random noise signal in the first data communication station;
   (b) transmitting, in order, said first pseudo-random noise signal, said loopback test signal, and said second pseudo-random noise signal from the first data communication station to the second data communication station by way of the transmission path;
   (c) receiving, in order, said first pseudo-random noise signal, said loopback test signal, and said second pseudo-random noise signal, at the second data communication station;
   (d) detecting the first pseudo-random noise signal at the second data communication station and creating a loopback signal transmission path therein;
   (e) transmitting the loopback test signal from the second data communication station to the first data communication station by means of the loopback signal transmission path and the transmission path;
   (f) receiving, at the first data communication station, the loopback test signal transmitted from the second data communication station, and comparing the received loopback test signal with the generated loopback test signal;
   (g) detecting the second pseudo-random noise signal at the second data communication station, and deactivating the loopback signal transmission parth, thereby finishing the loopback test.

2. A method as set forth in claim 1, wherein the generated loopback signal comprises only test data.

3. A method as set forth in claim 2, wherein the generated loopback test signal is provided with address data which specifies the second data communication station.

4. A method as set forth in claim 3, wherein the generated loopback test signal is provided with a succession of the address data and with command data which commands the commencement of the loopback test.

5. A method as set forth in claim 1, wherein step (a) includes generating the first and second pseudo-random noise signals by scrambling a first predetermined bit pattern and a different second predetermined bit pattern, respectively, and wherein steps (d) and (g) include detecting the generated first and second pseudo-random noise signals by detecting said first and second predetermined bit patterns, respectively, said first and second predetermined bit patterns obtained by descrambling the first and second pseudo-random noise signals, respectively.

6. A method as set forth in claim 5, wherein the first predetermined bit pattern is all "1" bit pulses, and the second predetermined bit pattern is all "0" bit pulses.

7. A method as set forth in claim 6, wherein the detections of steps (d) and (g) are performed by separately counting the "1" bit pulses and "0" bit pulses contained in the descrambled first and second pseudo-random noise signals, and wherein the counting of the "1" bit pulses is restarted at zero every time any of the "0" bit pulses are received at the second data communication station and the counting of the "0" bit pulses is restarted at zero every time any of the "1" bit pulses are received at the second data communication station.

8. A method as set forth in claim 1, wherein the comparison of step (f) is performed at the first data communication station by storing the generated loopback test signal, storing the received loopback test signal, and comparing the stored generated loopback test signal with the stored received loopback test signal to determine whether or not the two signals coincide.

9. Apparatus, for carrying out a loopback test in a data communication system having a first data communication station connected by a transmission path to a second data communication station, each of said first and second data communication stations having a transmitter and a receiver, comprising:

a central processing unit, having an error checking means, for providing a loopback test signal and a test control signal;

generator and control means, operatively connected to the transmitter and the receiver of the first data communication station and to said central processing unit, for generating first and second pseudo-random noise signals in dependence upon said test control signal and for controlling the transmission of said loopback test signal, wherein the first and second pseudo-random noise signals are transmitted by the transmitter of the first data communication station to the receiver of the second data communication station by way of the transmission path;

detector means, operatively connected between the receiver and the transmitter of the second data communication station, for detecting the first and second pseudo-random noise signals and for providing the transmitter of the second data communication station with a return loopback test signal for transmission to the receiver of the first data communication station, wherein said error checking means is operatively connected to said generator and control means, and wherein said error checking means compares said loopback test signal with said return loopback test signal, whereby a malfunction of the second data communication station is detected.

10. Apparatus as set forth in claim 9, wherein said generator and control means comprises:

a controller circuit, operatively connected to said central processing unit and to the receiver of the first data communication station, for receiving said test control signal and for controlling the loopback test;

a timer circuit, operatively connected to said controller circuit, for providing a character generating signal and first and second switching signals;

a character generator means, operatively connected to said timer circuit, for providing first and second bit pattern signals in dependence upon said character generating signal;

a first switch, operatively connected to said timer circuit and said character generator means, for conducting said first bit pattern signal or said second bit pattern signal in dependence upon said first switch signal;

a scrambler circuit, operatively connected to said first switch, for scrambling said first bit pattern signal or said second bit pattern signal which is conducted by said first switch and for outputting a scrambled signal;

a second switch, operatively connected to said controller circuit, said timer circuit, said scrambler circuit, said central processing unit, and the transmitter of the first data communication station, for providing either said scrambled signal or said loopback test signal to the transmitter of the first data communication station in dependence upon said second switch signal and said test control signal.

11. Apparatus as set forth in claim 10, wherein said detector means comprises:

a descrambler circuit, operatively connected to the receiver of the second data communication station, for receiving said scrambled signal and for providing an output corresponding to said first bit pattern signal or said second bit pattern signal;

a bit detector circuit, operatively connected to said descrambler circuit for providing a first loop signal when said first bit pattern signal is received and for providing a second loop signal when said second bit pattern signal is received;

a flip-flop, operatively connected to said bit detector circuit, for providing a third switch signal if said first loop signal is present and for providing a fourth switch signal if said second loop signal is present;

a third switch, operatively connected to said flip-flop and to the receiver of the second data communication station, for conducting said return loopback test signal when said third switch signal is present;

an address command detector circuit, operatively connected to said third switch, for providing a fifth switch signal;

a fourth switch, operatively connected to the transmitter and receiver of the second data communication system and to said address command detector circuit for conducting said return loopback test signal between the receiver and transmitter of the second data communication station when said address command detector circuit provides said fifth switch signal.

12. Apparatus as set forth in claim 9, wherein said error checking means comprises:

a first memory circuit, operatively connected to the transmitter of the first data communication station for receiving and storing said loopback test signal;

a second memory circuit, operatively connected to the receiver of the first data communication station, for receiving said return loopback test signal;

a comparator circuit, operatively connected to said first and second memory circuits, for determining whether said loopback test signal and said return loopback test signal coincide.

13. Apparatus as set forth in claim 10, wherein said timer circuit comprises: a first monostable multivibrator operatively connected to said controller circuit and to said first switch; a second monostable multivibrator, operatively connected to said controller circuit and to said second switch.

14. Apparatus as set forth in claim 13, wherein said controller circuit comprises:

a first delay flip-flop, operatively connected to said central processing unit, for receiving said test control signal;

a second delay flip-flop operatively connected to said first delay flip-flop;

a first AND gate having inputs which are operatively connected to said first and second delay flip-flops and having an output operatively connected to said first monostable multivibrator;

a second AND gate having inputs which are operatively connected to said first and second delay flip-flops;

a first OR gate having inputs which are operatively connected to the outputs of said first AND gate and said second AND gate and having an output which is operatively connected to said second monostable multivibrator;

a third AND gate having inputs operatively connected to said central processing unit and to the receiver of the first data communication station and having an output operatively connected to said error checking means; and wherein said first switch comprises:

fourth and fifth AND gates, having inputs operatively connected to said character generator means and said first monostable multivibrator;

a second OR gate having inputs operatively connected to the outputs of said fourth and fifth AND gates; and wherein said scrambler circuit comprises:

a first exclusive OR gate having an input operatively connected to the output of said second OR gate;

a shift register operatively connected to the output of said first exclusive OR gate;

a second exclusive OR gate having inputs operatively connected to said shift register and having an output operatively connected to an input of said first exclusive OR gate; and wherein said second switch comprises:

a sixth AND gate having inputs operatively connected to the output of said first OR gate and said second monostable multivibrator;

a seventh AND gate having an input operatively connected to said central processing unit for receiving said test control data signal and having an input operatively connected to said second monostable multivibrator;

a third OR gate having inputs operatively connected to the outputs of said sixth and seventh AND gates and having an output operatively connected to the transmitter of the first data communication station.

15. Apparatus as set forth in claim 11, wherein said descrambler circuit comprises:

a shift register operatively connected to the receiver of the second data communication station;

a first exclusive OR gate having inputs operatively connected to the receiver of the second data communication station and to the shift register;

a second exclusive OR gate having inputs operatively connected to the output of the first exclusive OR gate and to the shift register; and wherein said bit detector comprises:

first and second AND gates each having an input operatively connected to the output of said second exclusive OR gate;

first and second counters each of which is operatively connected to the outputs of said first and second AND gates; and wherein said flip-flop comprises a set reset flip-flop, said first counter operatively connected to the set input of said set reset flip-flop and said second counter operatively connected to the reset input of said set reset flip-flop; and wherein said third switch comprises:

a third AND gate having inputs operatively connected to the receiver of the second data communication station and the output of said set reset flip-flop; and wherein said address command detector circuit comprises:

an address shift register operatively connected to the output of said third AND gate;

an address comparator operatively connected to said shift register;

a read only memory operatively connected to said address comparator; and wherein said fourth switch comprises:

a switch set reset flip-flop having a set input operatively connected to said address comparator and having a reset input operatively connected to the output of said set reset flip-flop;

a fourth AND gate having an input operatively connected to the output of said switch set reset flip-flop and having an input operatively connected to the receiver of the second data communication station;

a fifth AND gate having an input operatively connected to the output of said switch set reset flip-flop;

a first OR gate having inputs operatively connected to the outputs of said fourth and fifth AND gates and having an output operatively connected to the transmitter of the second data communication station.

* * * * *

UNITED STATES PATENT AND TRADEMARK OFFICE
CERTIFICATE OF CORRECTION

PATENT NO. : 4,271,513
DATED : June 2, 1981
INVENTOR(S) : HIROSHI MAEJIMA ET AL.

It is certified that error appears in the above—identified patent and that said Letters Patent is hereby corrected as shown below:

On the title page, Assignee should read -- (73) Nippon Telegraph and Telephone Public Corporation, Tokyo, Japan, Fujitsu Limited, Kawasaki-shi, Oki Electric Industry Co., Ltd., and Nippon Electric Co., Ltd. Tokyo, Japan --.

[30] Foreign Application Priority Data, "53-598073" should be --53-59807--.

Col. 1, line 27, after "and" insert --the--;
line 45, after "example" insert --,--;
line 54, "have" should be --has--;
line 61, before "third" insert --a--.

Col. 2, lines 3 and 6, "can not" should be --cannot--;
line 40, "2, and;" should be --2; and--.

Col. 3, line 61, "gushing" should be --guishing--.

Col. 4, line 54, "polynominal," should be --polynomial,--;
line 66, after "of" insert --the--.

UNITED STATES PATENT AND TRADEMARK OFFICE
CERTIFICATE OF CORRECTION

PATENT NO. : 4,271,513
DATED : June 2, 1981
INVENTOR(S) : HIROSHI MAEJIMA ET AL.

It is certified that error appears in the above—identified patent and that said Letters Patent is hereby corrected as shown below:

Col. 5, line 2, "psuedo-random" should be --pseudo-random--;
line 6, "ocurence" should be --occurrence--;
line 11, "bit" should be --bits--;
line 42, "AT" should be --At--;
line 55, "polynominal" should be --polynomial--.

Col. 6, line 8, "polynominal" should be --polynomial--.

Col. 7, line 3, "can not" should be --cannot--;
line 46, after "accordingly" insert --,--.

Signed and Sealed this

Eighth Day of December 1981

[SEAL]

Attest:

GERALD J. MOSSINGHOFF

Attesting Officer — Commissioner of Patents and Trademarks